US009246587B2

(12) United States Patent
Bliss et al.

(10) Patent No.: US 9,246,587 B2
(45) Date of Patent: Jan. 26, 2016

(54) COMPENSATION FOR OPTICAL MULTI-PATH INTERFERENCE

(71) Applicant: Broadcom Corporation, Irvine, CA (US)

(72) Inventors: William Bliss, Granite Canyon, WY (US); John Wang, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 134 days.

(21) Appl. No.: 13/927,927

(22) Filed: Jun. 26, 2013

(65) Prior Publication Data

US 2014/0308046 A1    Oct. 16, 2014

Related U.S. Application Data

(60) Provisional application No. 61/812,160, filed on Apr. 15, 2013.

(51) Int. Cl.
*H04B 10/69* (2013.01)
*H04B 10/2507* (2013.01)

(52) U.S. Cl.
CPC ............ *H04B 10/2507* (2013.01); *H04B 10/69* (2013.01); *H04B 10/695* (2013.01); *H04B 10/697* (2013.01); *H04B 10/6971* (2013.01)

(58) Field of Classification Search
CPC .. H04B 10/2507; H04B 10/69; H04B 10/695; H04B 10/697; H04B 10/6971
See application file for complete search history.

(56) References Cited

U.S. PATENT DOCUMENTS

| | | | | |
|---|---|---|---|---|
| 5,712,873 | A | * | 1/1998 | Shiue et al. ................... 375/233 |
| 6,011,813 | A | * | 1/2000 | Ghosh .......................... 375/233 |
| 6,418,164 | B1 | * | 7/2002 | Endres et al. ................. 375/232 |
| 7,027,500 | B1 | * | 4/2006 | Casas et al. ................... 375/232 |
| 2005/0157820 | A1 | * | 7/2005 | Wongwirawat et al. ...... 375/326 |

\* cited by examiner

*Primary Examiner* — Leslie Pascal
(74) *Attorney, Agent, or Firm* — Sterne, Kessler, Goldstein & Fox P.L.L.C.

(57) ABSTRACT

Systems and methods for optical multi-path interference (MPI) compensation are provided. In an embodiment, a mean MPI signal representing a mean amplitude of the MPI in an input signal is generated and subtracted from a first estimate of transmitted amplitude of the input signal to generate a mean MPI compensated estimate of transmitted amplitude. The mean MPI compensated estimate of transmitted amplitude is sliced to generate a decision of transmitted amplitude of the input signal. The mean MPI signal can be generated using a mean MPI feedback loop or using an iterative feedforward process. In another embodiment, mean MPI levels corresponding to respective transmitted intensity levels are generated and used to control slice levels of a slicer in order to compensate for MPI.

20 Claims, 8 Drawing Sheets

COMPENSATION FOR OPTICAL MULTI-PATH INTERFERENCE

CROSS-REFERENCE TO RELATED APPLICATIONS

The present invention claims the benefit of U.S. Provisional Application No. 61/812,160, filed Apr. 15, 2013, which is incorporated herein by reference in its entirety.

FIELD OF THE INVENTION

The present disclosure relates generally to compensation for optical multi-path interference.

BACKGROUND

Background Art

Multi-path interference (MPI) is an issue that presents itself on single mode fiber optical systems. For such optical systems, optical connections, including coupling into and out of an optical fiber, can cause reflections which can result in a substantial number of extra signal paths from the optical transmitter to the optical receiver. The extra signal paths arrive at the receiver with some delay from the main (non-reflected) path signal and can interfere with subsequent transmissions.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
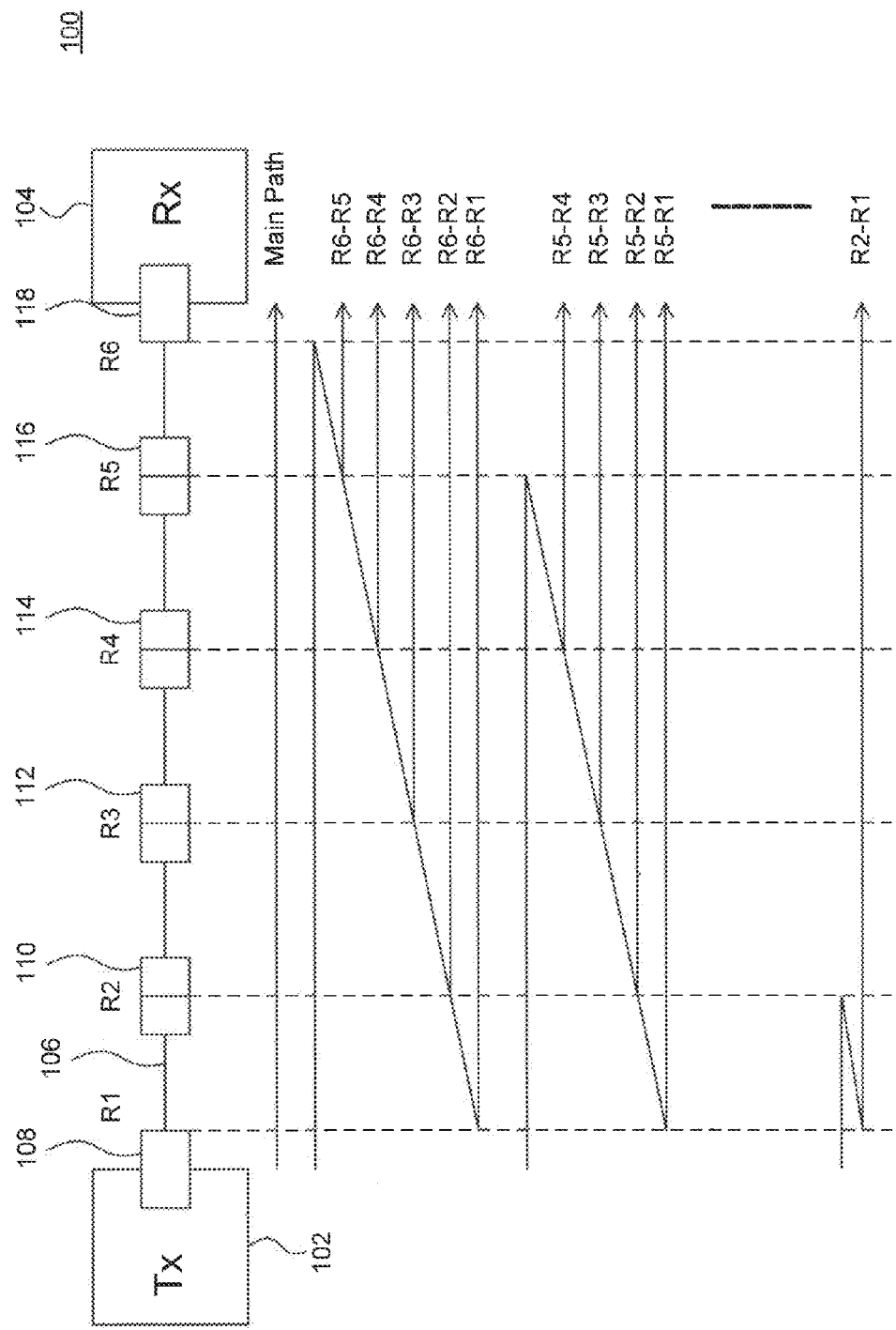
FIG. 1 illustrates an example optical link.

FIG. 1 illustrates an example optical link 100. Example optical link 100 is provided for the purpose of illustration only and is not limiting of embodiments. As shown in FIG. 1, example optical link 100 includes a transmitter 102 (e.g., laser diode) and a receiver 104 (e.g., photo-diode), connected via an optical fiber 106. Optical fiber 106 can be a single mode optical fiber.

A connector R1 108 couples transmitter 102 to optical fiber 106, and a connector R6 118 couples optical fiber 106 to receiver 104. In addition, intermediate connectors, such as R2 110, R3 112, R4 114, and R5 116, can be placed between R1 108 and R6 118. For example, the intermediate connectors can be used to facilitate the installation of optical fiber from transmitter 102 to receiver 104.

When a signal is transmitted from transmitter 102 to receiver 104, the power contained in the transmitted signal is not received all at once (or entirely) at receiver 104. Instead, receiver 104 receives a main path signal which travels from transmitter 102 to receiver 104 without experiencing any reflection and a series of reflection signals, each resulting from a portion of the transmitted signal experiencing two (or more, e.g., 4, 6. 8, . . . ) reflections at respective connectors of R1 108 through R6 118 before reaching receiver 104.

In the case of six connectors as in example optical link 100, up to 15 reflection signals can be received by receiver 104, counting only reflection signals that result from a portion of the transmitted signal experiencing only two reflections before reaching receiver 104. These reflection signals are illustrated in FIG. 1 with the notation Rx-Ry, where Rx represents the first connector and Ry represents the second connector at which a reflection occurs before the reflection signal reached receiver 104.

The reflection signals can be received at the same rime or at different times depending on their respective paths traveled to reach receiver 104, but arrive after the main path signal has been received. The reflection signals interfere with subsequently transmitted signals in the form of multi-path interference (MPI).

Figure 2:
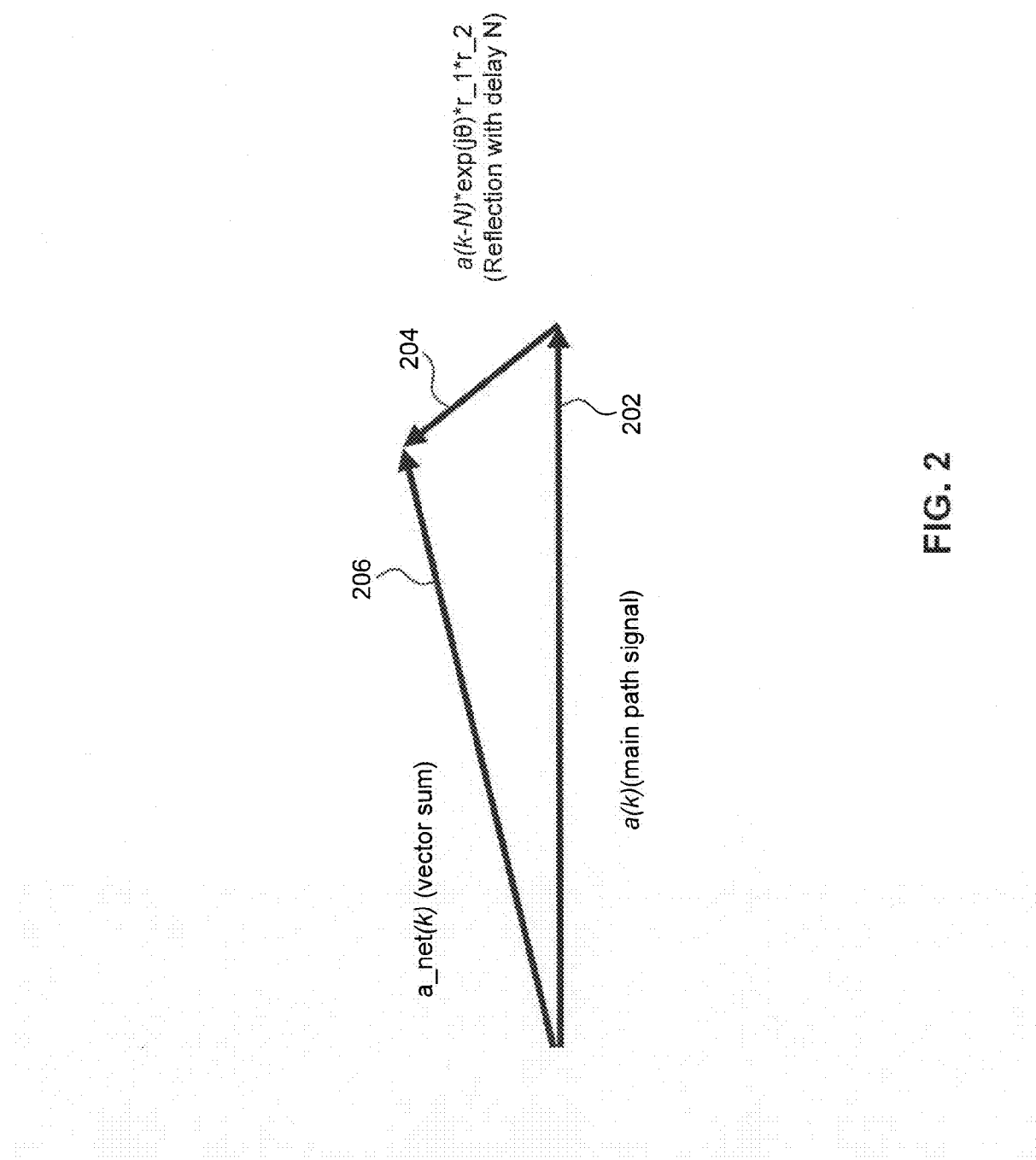
FIG. 2 illustrates in mathematical representation the addition at an optical receiver of a main path signal and a delayed reflection signal.

FIG. 2 illustrates a graphical representation 200 of the addition of a main path signal 202 and a reflection signal 204 that occurs at connection/reflection point (e.g., connector R6 118 in FIG. 1). The addition at an optical receiver (e.g., receiver 104 in FIG. 1) is mathematically equivalent. For the purpose of illustration, main path signal 202 is transmitted at a time k with an amplitude a(k). Reflection signal 204 is due to a signal transmitted at a time k-N and which is delayed by N (due to two reflections at two connectors) so as to arrive at the same time k as main path signal 202.

As shown in FIG. 2, reflection signal 204 can be written mathematically as $a(k-N)*\exp(j\theta)*r\_1*r\_2$, where $a(k-N)$ is the amplitude of the signal transmitted at time k-N, $\theta$ is the relative phase offset between reflection signal 204 and main path signal 202, $r\_1$ is an attenuation factor due to the first reflection of reflection signal 204, and $r\_2$ is an attenuation factor due to the second reflection of reflection signal 204.

The net sum of main path signal 202 and reflection signal 204 is illustrated as a_net(k) 206 in FIG. 2, and can be approximated as a_net(k)≈a(k)+a(k−N)*cos(θ)*r_1*r_2, because r_1 and r_2 are relatively small fractions. a_net(k) 206 is linear in a(k−N) and r_1 and r_2 if θ is approximately constant. In practice however, θ is not constant because the phase of the transmitter and/or the time delay of the reflection path can change between times (k−N) and k. As a result, to compensate for reflection signal 204, typically the amplitude and the relative phase offset θ are tracked (for example, the net product of the amplitude and the cosine of θ can be tracked).

Figure 3:
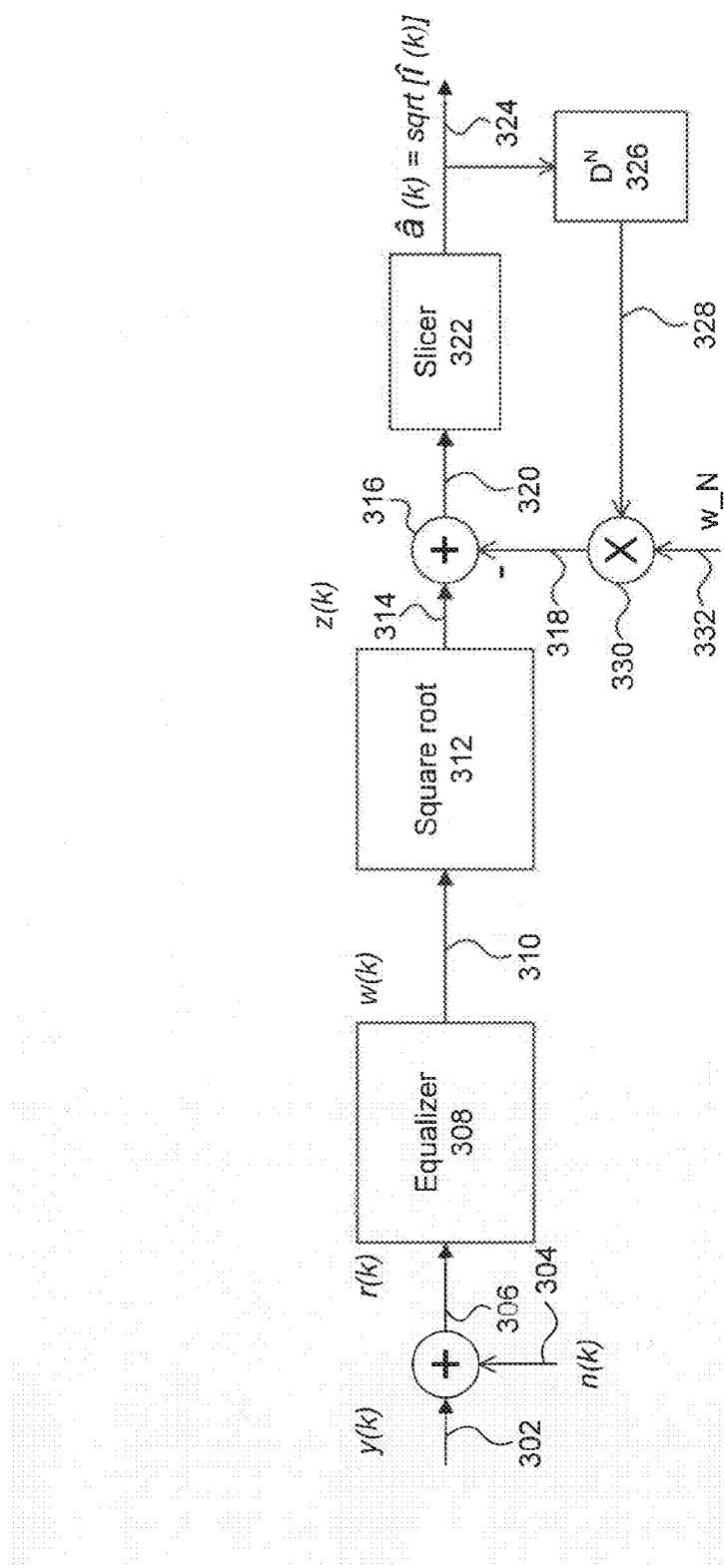
FIG. 3 illustrates an example decision-feedback based system for optical multi-path interference (MPI) compensation according to an embodiment.

FIG. 3 illustrates an example decision-feedback based system 300 for optical multi-path interference (MPI) compensation according to an embodiment. Example system 300 is provided for the purpose of illustration only and is not limiting of embodiments. Example system 300 can be implemented within a receiver, such as receiver 104, for example. As shown in FIG. 3, example system 300 includes an equalizer 308, a converter module 312, a slicer 322, and a decision feedback loop, including a delay module 326, a multiplier 330, and a subtractor module 316. Slicer 322 can be any known data detector, including a decision feedback equalizer (DFE) based detector, a Maximum Likelihood Sequence Detector (MLSD), or a Viterbi detector, to name a few examples.

At any time k, system 300 is configured to receive a signal r(k) 306, which can be a measure of light intensity. Signal r(k) 306 is the sum of a received input signal y(k) 302 and a noise signal n(k) 304. Input signal y(k) 302 can include a main path signal and unwanted reflections (e.g., MPI) due to connectors, for example, placed in the path between the transmitter and system 300. Typically, the main path signal includes information conveyed by selecting a light intensity level from a plurality of light intensity levels (e.g., Pulse Amplitude Modulation (PAM)-M) and transmitting at the selected light intensity level for a pulse duration. Due to noise signal n(k) 304 and the unwanted reflections, signal r(k) 306 can vary from the transmitted light intensity. System 300 can be used to compensate for the MPI present in input signal y(k) 302 and to reduce the effects of the MPI in deciding the transmitted light intensity for input signal y(k) 302.

Equalizer 308 is configured to receive signal r(k) 306 and to produce a signal w(k) 310. Signal w(k) 310 represents a noisy estimate of the transmitted intensity. In an embodiment, equalizer 308 is configured to act on signal r(k) 306 to reduce the noise level in signal w(k) 310. Converter module 312 is configured to perform a square root operation on signal w(k) 310 to generate a signal z(k) 314. Because, light intensity is proportional to the square of light wave amplitude, signal z(k) 314 represents a measure of light amplitude.

Subtractor module 316 is configured to subtract a feedback signal 318 from signal z(k) 314 to generate a slicer input signal 320. As further described below, feedback signal 318 represents an amplitude estimate of a reflection signal, received at time k, that is due to a main path signal transmitted at time (k−N) (N pulses ago). As shown in FIG. 3, feedback signal 318 is generated by delaying output signal â(k) 324 using delay module 326 by N pulse times to generate signal 328 and multiplying signal 328 by a scaling factor w_N 332 via multiplier 330. Scaling factor w_N 332 accounts for a relative phase offset θ between the main path signal and the reflection signal (at reception time) and for the attenuation incurred by the reflection signal before arriving at system 300. In an embodiment, only the first two reflections of the reflection signal are accounted for in scaling factor w_N 332.

Slicer 322 is configured to act on input signal 320 (which is a decision feedback compensated estimate of transmitted amplitude) to generate output signal â(k) 324. In an embodiment, slicer 322 slices input signal 320 into one of a plurality of amplitude -levels. Output signal â(k) 324 represents a decision regarding transmitted light amplitude at time k. The decision feedback loop allows output signal â(k) 324 to be substantially free from the effects of the reflection signal due the main path signal transmitted at time (k−N). Similar loops can be implemented to reduce the effects of other reflection signals due to the main path signal transmitted at time (k−N). However, this means that up to M choose 2 previous pulses (where M is the number of connectors between the transmitter and the receiver) need to be tracked and removed before acting on input signal 320 by slicer 322, in order to perform full MPI compensation.

Another approach according to embodiments, as further described below, instead only tracks the mean amplitude level of MPI and subtracts the mean amplitude MPI before slicing the transmitted amplitude. Because the range encompassed by the amplitude levels of slicer 322 is smaller than the range encompassed by the light intensity levels of the transmitter (amplitude being the square root of light intensity) and because the actual amplitudes of MPI over time are uncorrelated, the actual MPI amplitudes do not vary a lot from the mean when taken over a large sample and the mean MPI can be used to achieve good MPI compensation without significant implementation complexity. Example embodiments using this approach are presented below with reference to FIGS. 4-8. As would be understood by a person of skill in the art, embodiments are not limited by these example embodiments and extend to any implementation using the mean MPI for MPI compensation.

Figure 4:
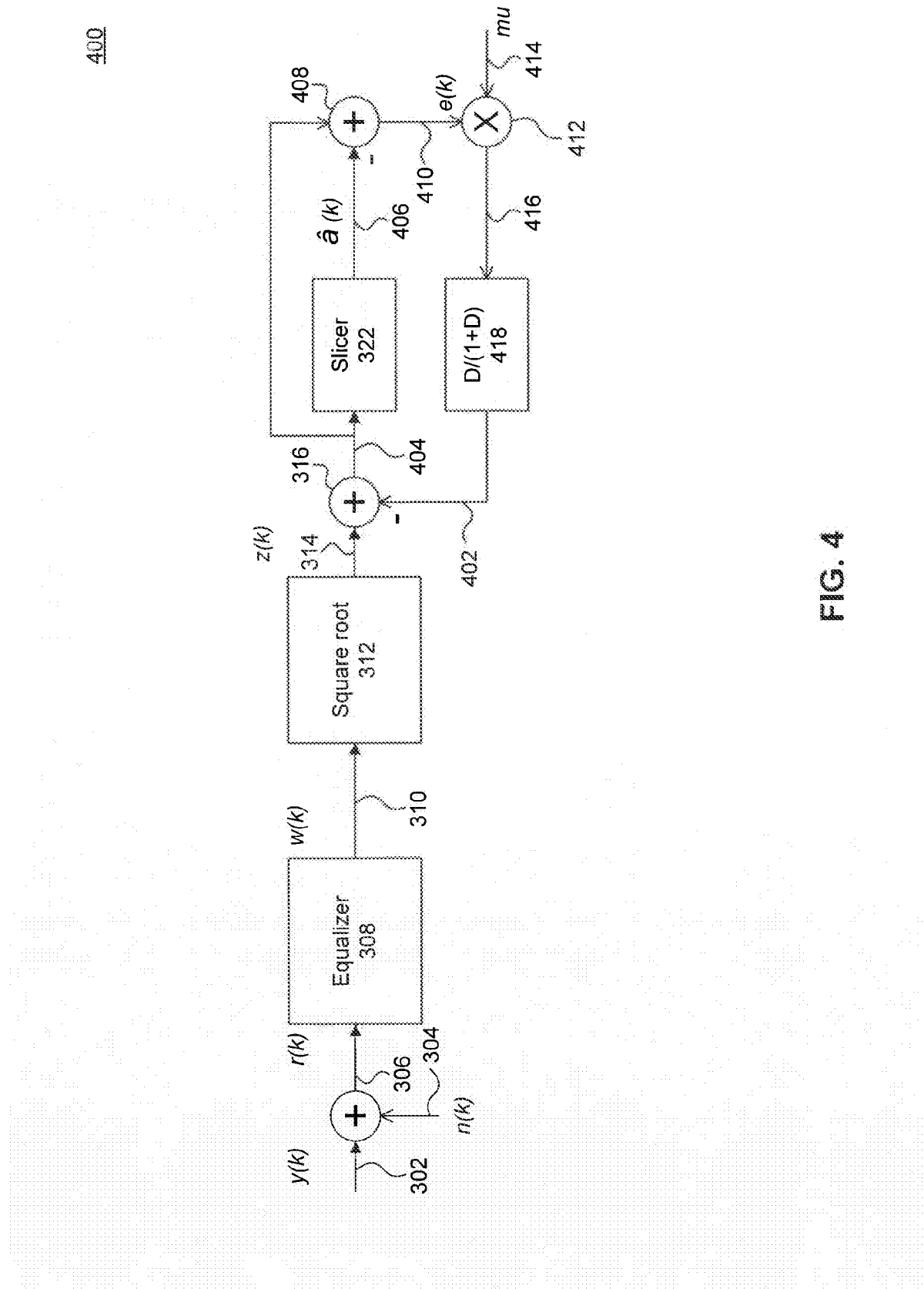
FIG. 4 illustrates an example mean MPI tracking based system for optical MPI compensation according to an embodiment.

FIG. 4 illustrates an example mean MPI tracking based system 400 for optical MPI compensation according to an embodiment. Example system 400 is provided for the purpose of illustration only and is not limiting of embodiments. Example system 400 can be implemented within a receiver, such as receiver 104, for example. As shown in FIG. 4, example system 400 includes an equalizer 308, a converter module 312, a slicer 322, and a mean MPI feedback loop, including a subtractor module 408, a multiplier 412, an accumulator module 418, and a subtractor module 316.

As described above with reference to FIG. 3, equalizer 308 is configured to receive signal r(k) 306 and to produce signal w(k) 310, which is an estimate of transmitted light intensity of input signal y(k) 302. Converter module 312 is, configured to receive signal w(k) 310 and to generate signal z(k) 314, which is a first (noisy) estimate of transmitted amplitude of input signal y(k) 302. In an embodiment, converter 312 is configured to perform a square root operation on signal w(k) 310 to generate signal z(k) 314.

Subtractor module 316 is configured to subtract a mean MPI signal 402 from signal z(k) 314 to generate a mean MPI compensated estimate 404 of transmitted amplitude of input signal y(k) 302. As further described below, mean MPI signal 402 represents a current mean (time average) amplitude level estimate of MPI, and is generated by the mean MPI feedback loop based on a difference (error) between mean MPI compensated estimate 404 and a decision 406 regarding transmitted amplitude of input signal y(k) 302, generated by slicer 311. Mean MPI signal 402 is a continuous estimate of the mean amplitude level of MPI and decision 406 is a discrete value. Specifically, as shown in FIG. 4, slicer 322 is configured to receive mean MPI compensated estimate 404 and to generate decision 406. Subtractor module 408 is configured to subtract mean MPI compensated estimate 404 from decision 406 to generate a difference signal 410, which represents a slicer error. Multiplier 412 is configured to multiply difference signal 410 by a loop gain factor 414 to generate a scaled difference signal 416. Accumulator module 418 is configured to receive difference signal 416 from multiplier 412 and to accumulate (or integrate) difference signal 416 to generate mean MPI signal 402. In an embodiment, accumulator module 418 is an infinite impulse response (IIR) filter.

Whenever difference signal 410 is positive (i.e., mean MPI compensated estimate 404 is larger than decision 406), slicer 322 is mapping down mean MPI compensated estimate 404 to a slice level (mean MPI compensated estimate 404 is greater than the selected slice level). The mean MPI feedback loop corrects this by reducing mean MPI compensated estimate 404, which has the same effect as moving up by the same amount all of the slice levels of slicer 322. Conversely, whenever difference signal 410 is negative (i.e., mean MPI compensated estimate 404 is lower than decision 406), slicer 322 is mapping up mean MPI, compensated estimate 404 to a slice level (mean MPI compensated estimate 404 is lower than the selected slice level). The mean MPI feedback loop corrects this by increasing mean MPI compensated estimate 404, which has the same effect as moving down by the same amount all of the slice levels of slicer 322. Thus, on average, difference signal 410 is driven to a substantially zero mean.

Typically, the variance from the mean MPI amplitude is due in part to the fact that reflection signals, arrive with varying phase offset θ relative to the main path signal over time. This can be caused in part by variations at the laser diode transmitter and can be related to the line width/coherence time (frequency stability) of the laser diode transmitter. By tracking the mean MPI as described above, the net change in the relative phase offset θ is also being tracked. To reduce the effects of the varying phase offset on the tracked mean MPI amplitude, the mean MPI amplitude needs to be tracked faster than a coherence time of the laser diode transmitter. Generally, it is desired to use less expensive laser diode transmitters in implementation, which typically have lower coherence time and higher line width (less frequency stability). The bandwidth of the mean MPI feedback loop in example system 400 determines how fast the mean MPI can be tracked and thus places an upper bound on the line width of laser diode transmitters that can be used with example system 400. In an embodiment, the bandwidth of the mean MPI feedback loop can be controlled by varying loop gain factor 414. For example, to increase the bandwidth, loop gain factor 414 can be increased (though very large gain factors can cause the feedback loop to become unstable).

Figure 5:
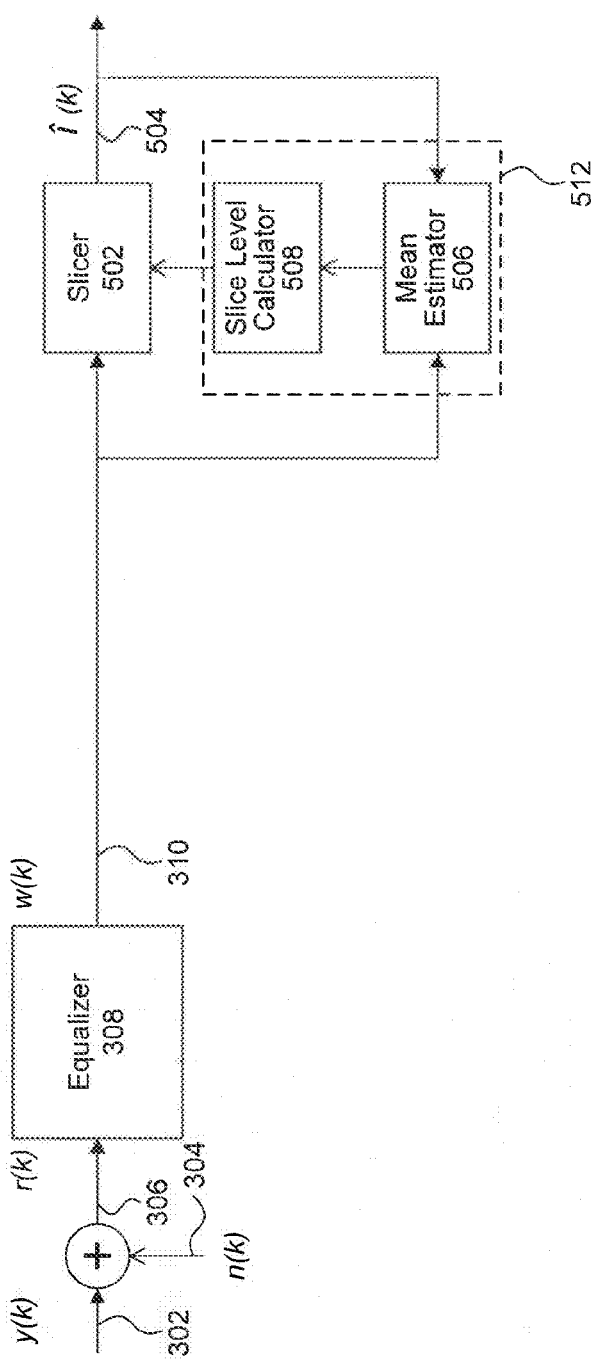
FIG. 5 illustrates another example mean MPI tracking based system for optical MPI compensation according to an embodiment.

FIG. 5 illustrates another example mean MPI tracking based system 500 for optical MPI compensation according to an embodiment. Example system 500 is provided for the purpose of illustration only and is not limiting of embodiments. Example system 500 can be implemented within a receiver, such as receiver 104, for example. As shown in FIG. 5, example system 500 includes an equalizer 308, a slicer 502, and a control module 512. Control module 512 includes an estimator module 506 and a calculator module 508. Slicer 502 can be any known data detector, including a decision feedback equalizer (DFE) based detector, a Maximum Likelihood Sequence Detector (MLSD), or a Viterbi detector, to name a few examples.

As, described above with reference to FIG. 3, equalizer 308 is configured to receive signal r(k) 306 and to produce signal w(k) 310, which is a first estimate of transmitted light intensity of input signal y(k) 302. Slicer 502 is configured to provide a decision 504 of transmitted light intensity of input signal y(k) 302 from the first estimate w(k) 310. It is noted that in contrast to slicer 322, described with reference to FIGS. 3 and 4 above, which operates in the amplitude domain, slicer 502 operates in the intensity domain. For this reason, mean MPI compensation as further described below is performed per slice level of slicer 502, instead of effectively shifting up/down all slice levels simultaneously by compensating the slicer input signal as in example system 400, for example. In an embodiment, this is performed using control module 512 which can be configured to control at least one slice level of slicer 502 responsive to at least one mean MPI level associated with the at least one slice level. In another embodiment, control module 512 is configured to control each slice level of slicer 502 responsive to a corresponding mean MPI level associated with said each slice level.

Estimator module 506 is configured to estimate a respective mean MPI level for each slice level of slicer 502. In an embodiment, estimator module 506 implements a plurality of tracking loops, one for each slice level, which can be similar to the mean MPI feedback loop of example system 400. The tracking loop for a particular slice level can be configured to accumulate a difference between the first estimate w(k) 310 of transmitted light intensity and decision 504 of transmitted light intensity when decision 504 corresponds to the particular slice level, to estimate the mean MPI level associated with the particular slice level. In another embodiment, the plurality of tracking loops each tracks a mean level of a respective transmitted intensity level of input signal y(k) 302. For example, if PAM-M transmission is used by the transmitter, estimator module 506 can estimate M mean levels for the M transmitted intensity levels of the PAM-M scheme.

Estimator module 506 is configured to provide the respective mean MPI level estimates associated with the slice levels to calculator module 508. Calculator module 508 is configured to calculate an updated value of the at least one slice level of slicer 502 based on the mean MPI level associated with the slice level, and to update the at least one slice level using the updated value. In an embodiment, calculator module 508 is configured to add the mean MPI level associated with the at least one slice level to the at least one slice level to calculate the updated value of the at least one slice level.

In another embodiment, estimator module 506 is configured to provide the estimated M mean levels for the M transmitted intensity levels used by the transmitter. Calculator module 508 is configured to calculate M-1 slice levels based on the M mean levels (the M-th slice level being zero). In an embodiment, calculator module 508 sets each of the M-1 slice levels midway between corresponding adjacent lower and upper estimated mean levels. in another embodiment, calculator module 508 sets the M-1 slice levels such that an equal number of errors are made in the positive and negative directions (e.g., zero mean slicer error).

Figure 6:
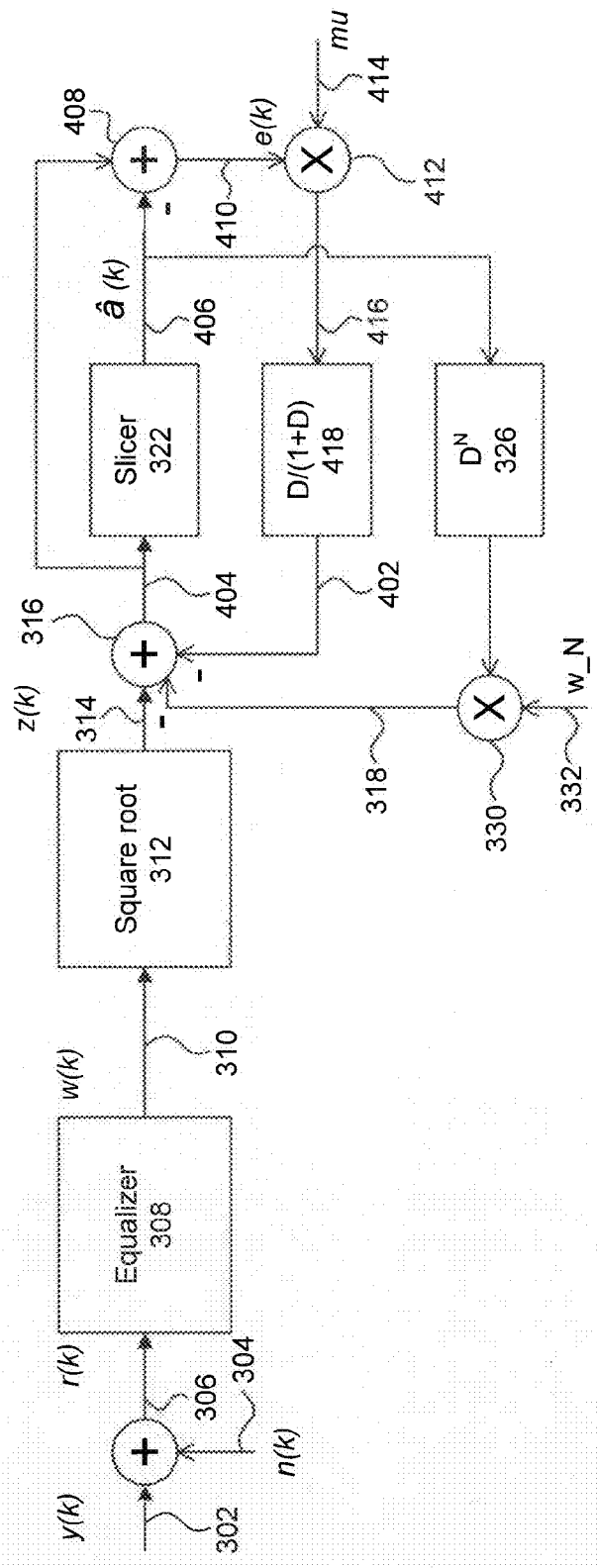
FIG. 6 illustrates an example hybrid system for optical MPI compensation according to an embodiment.

FIG. 6 illustrates an example hybrid system 600 for optical MPI compensation according to an embodiment. Example system 600 is provided for the purpose of illustration only and is not limiting of embodiments. Example system 600 can be implemented within a receiver, such as receiver 104, for example.

As shown in FIG. 6, example system 600 is a hybrid of example systems 300 and 400 described above with reference to FIGS. 3 and 4. Specifically, example system 600 includes a decision feedback loop like example system 300 and a mean MPI feedback loop like example system 400. In an embodiment, the two feedback loops operate in parallel and can have same or different bandwidths. In another embodiment, the decision feedback loop is configured (e.g., by configuring the maximum delay 'N' of the feedback loop) to track short reflections (e.g., reflections with lengths shorter than a coherence length of the laser diode) and the mean MPI feedback loop is configured (e.g., bandwidth configured) to track any remaining reflections (e.g., reflections with lengths greater than the coherence length of the laser diode). As such, the decision feedback loop can be designed with lower bandwidth (which is easier and less expensive) because short reflections have nearly stationary attenuation and relative phase offset θ and do not require high speed tracking. Long reflections which have more variations in terms of attenuation and the relative phase offset θ can be handled with a mean MPI feedback loop. The required bandwidth of the mean MPI feedback loop for adequate tracking is primarily determined by the laser linewidth.

Figure 7:
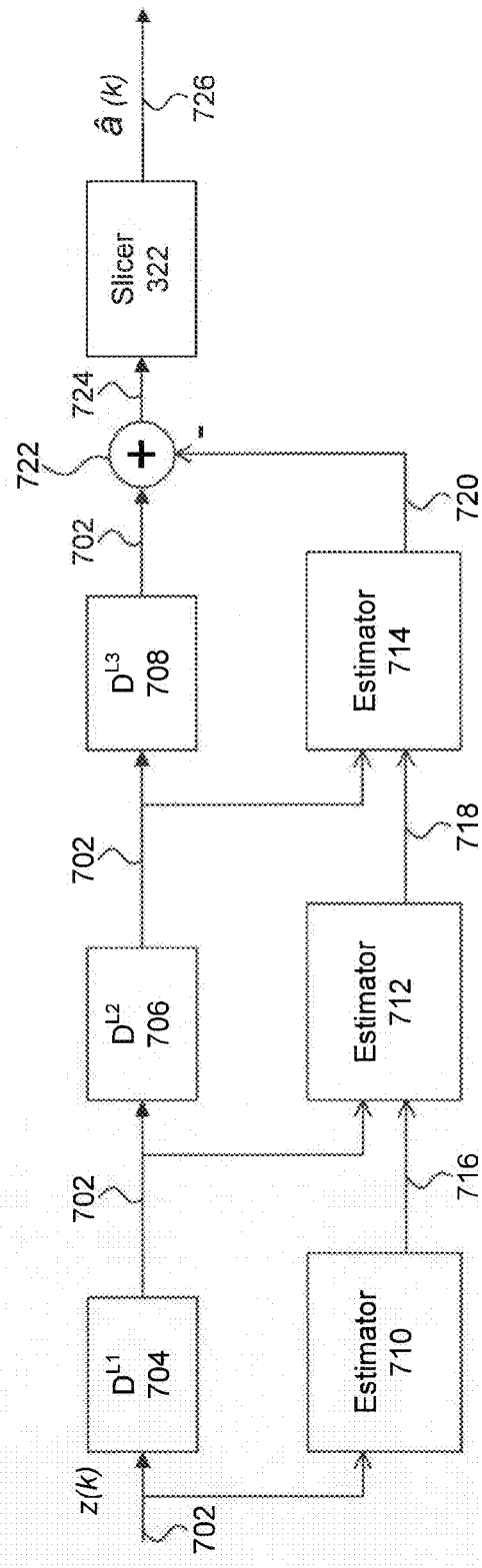
FIG. 7 illustrates an example feed-forward iterative mean MPI tracking based system for optical MPI compensation according to an embodiment.

FIG. 7 illustrates an example feed-forward iterative mean MPI tracking based system 700 for optical MPI compensation according to an embodiment. example system 700 is provided for the purpose of illustration only and is not limiting of embodiments. Example system 700 can be implemented within a receiver, such as receiver 104, for example. As shown in FIG. 7, example system 700 includes, among other components, first, second, and third delays modules 704, 706, and 708; first, second, and third mean MPI estimators 710, 712, and 714; a subtractor module 722; and a slicer 322.

Estimator 710 is configured to receive a signal $z(k)$ 702, which represents a first estimate of transmitted amplitude of an input signal system 700. Signal $z(k)$ 702 can be the output of a converter module, such as converter module 312, for example. Using signal $z(k)$ 702, estimator 710 generates a first mean amplitude 716 of the optical MPI. In an embodiment, estimator 710 operates on a data block and as such receives multiple $z(k)$ values (which correspond to multiple estimates of transmitted amplitudes of the data block) to generate first mean amplitude 716. In an embodiment, estimator 710 includes a statistical estimator configured to perform a statistical operation on the estimates of transmitted amplitudes of the data block to generate first mean amplitude 716 of the optical MPI. For example, estimator 710 can determine the maximum amplitude and the minimum amplitude from the estimates of transmitted amplitudes and calculate first mean amplitude 716 from the maximum and minimum amplitudes.

First, delay module 704 is configured to delay signal $z(k)$ 702 by a delay that matches the processing delay of estimator 710. When estimator 710 outputs first mean amplitude 716, first delay module 704 releases $z(k)$ 702 (or a buffered data block) to estimator 712. Estimator 712 is configured to receive signal $z(k)$ 702 and first mean amplitude 716 and to generate a second mean amplitude 718 of the optical MPI. In an embodiment, second mean amplitude 718 is more refined than first mean amplitude 716. In an embodiment, estimator 712 uses a decision directed estimator with erasure. In an embodiment, estimator 712 includes an erasure slicer configured to reduce signal $z(k)$ 702 (whish represents a first estimate of transmitted amplitude) by first mean amplitude 716 to generate a third estimate of transmitted amplitude; slice the third estimate of transmitted amplitude to generate a fourth estimate of transmitted amplitude of the input signal; generate slicer errors between the third estimate and the fourth estimate; discard slicer errors with absolute value greater than a predefined threshold; and calculate second mean amplitude 718 as the mean of the remaining slicer errors.

Second delay module 706 is configured to delay signal $z(k)$ 702 by a delay that matches the processing delay of estimator 712. When estimator 712 outputs second mean amplitude 718, second delay module 706 releases $z(k)$ 702 (or a buffered data block.) to estimator 714. Estimator 714 is configured to receive signal $z(k)$ 702 and second, mean amplitude 718 and to generate third mean amplitude 720 of the optical MPI. In an embodiment, third mean amplitude 720 is more refined than second mean amplitude 718. In an embodiment, estimator 714 uses a similar estimator as estimator 712, but which does not include erasure (e.g., all slicer errors are used to compute the mean).

Third delay module 708 is configured to delay signal $z(k)$ 702 by a delay that matches the processing delay of estimator 714. When estimator 714 outputs third mean amplitude 720, third delay module 708 releases, $z(k)$ 702 (or a buffered data block) to subtractor module 722. Subtractor module 722 is configured to subtract third mean amplitude 720 from signal $z(k)$ 702 to generate slicer input signal 724.

Slicer input signal 724 represents a mean MPI compensated estimate of transmitted amplitude of the input signal. In other embodiments, input signal 724 can be generated by subtracting, first mean amplitude 716 or second mean amplitude 718 from signal $z(k)$ 702. Slicer 322 is configured to slice input signal 724 to generate a decision 726 regarding the transmitted amplitude of the input signal.

As would be understood by a person of skill in the art based on the teachings herein, any number of mean estimators can be used according to embodiments in example system 700, with a larger number typically resulting in a better mean amplitude estimate and improved optical MPI compensation. The feed-forward design of system 700 also provides improved optical MPI compensation as it allows higher tracking speed of the mean MPI (not limited by the implementation time delay in the feedback loop which can limit the achievable bandwidth).

Figure 8:
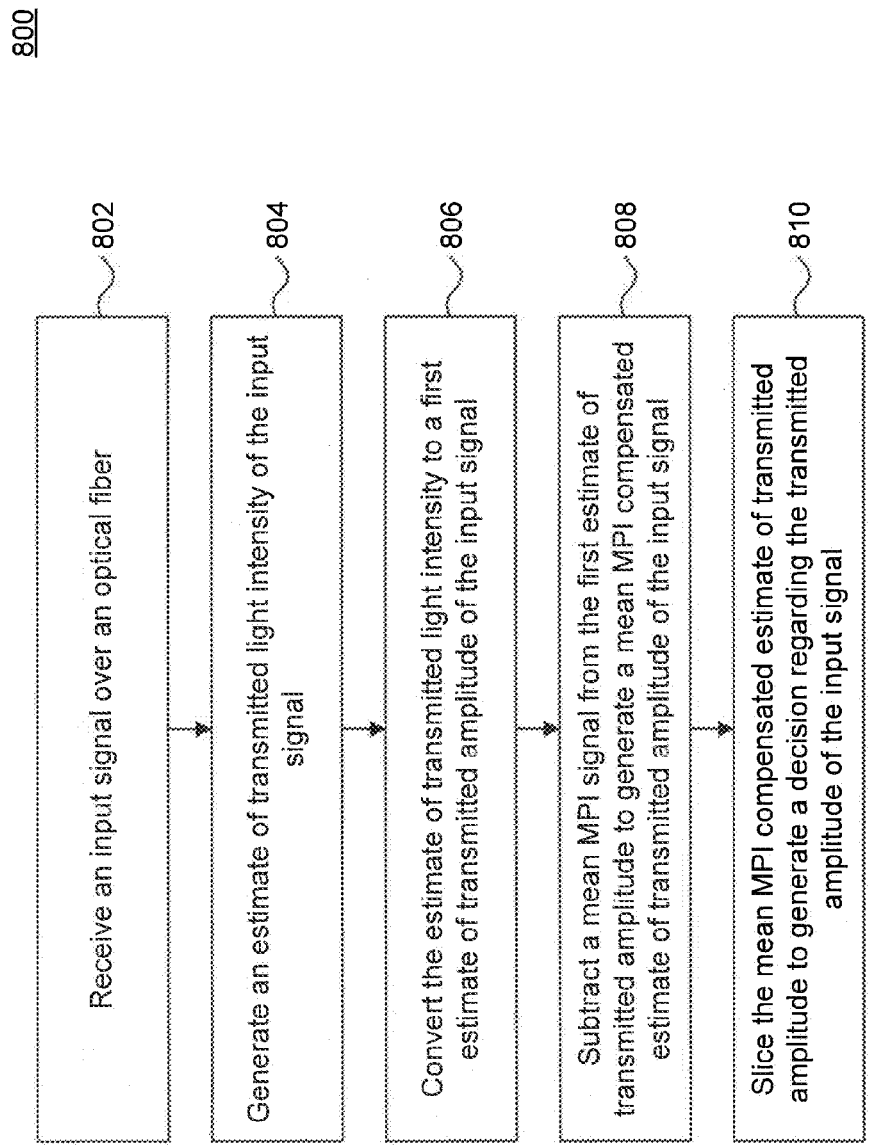
FIG. 8 illustrates an example process according to an embodiment.

FIG. 8 illustrates an example process 800 according to an embodiment. Example process 800 is provided for the purpose of illustration only and is not limiting of embodiments. Example process 800 can be used by a system such as example systems 400, 600, and 700, for example, to compensate for optical MPI in an input signal.

As shown in FIG. 8, process 800 begins in step 802, which includes receiving an input signal over an optical fiber. In an embodiment, the input signal includes a main path signal of a transmitted signal, MPI due to reflections from previously transmitted signals, and noise.

Subsequently, step 804 includes generating an estimate of transmitted light intensity of the input signal. In an embodiment, step 804 is performed by an equalizer, such as equalizer 308, to generate a noisy estimate of the transmitted light intensity of the input signal.

Then, in step 806, process 800 includes converting the estimate of transmitted light intensity to a first estimate of transmitted amplitude of the input signal. In an embodiment, step 806 is performed by a converter module, such as converter module 312, which performs a square root operation on the estimate of transmitted light intensity to generate the first estimate of transmitted amplitude of the input signal. In other embodiments, as described in FIG. 5 above for example, the process operates on transmitted light intensity, without converting to transmitted light amplitude. As such, step 806 can be skipped, and subsequent steps of process 800 can be modified to operate with transmitted light intensity instead of transmitted light amplitude.

Subsequently, step 808 includes subtracting a mean MPI signal from the first estimate of transmitted amplitude to generate a mean MPI compensated estimate of transmitted amplitude of the input signal. The mean MPI signal represents a mean (time average) amplitude level of MPI. In an embodiment, the mean MPI signal is generated by a mean MPI feedback loop, as described above with reference to FIG.

4. The mean MPI signal can be based on a difference (error) between the mean MPI compensated estimate and a decision regarding the transmitted amplitude of the input signal, generated by a slicer. In another embodiment, the mean MPI signal is generated using a feed-forward iterative process as described above with reference to FIG. 7.

Process 800 terminates in step 810, which includes slicing the mean MPI compensated estimate of transmitted amplitude to generate a decision regarding the transmitted amplitude of the input signal. In an embodiment, step 810 is performed by a slicer, such as slicer 322, to map the mean MPI compensated estimate of transmitted amplitude to one of a plurality of slice levels of the slicer. The selected slice level represents the decision regarding the transmitted amplitude of the input signal.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are, appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A system for compensating for optical multi-path interference (MPI) in an input signal received over an optical fiber, comprising:
    a converter module configured to receive an estimate of a transmitted light intensity of the input signal and to generate a first estimate of a transmitted amplitude of the input signal; and
    a slicer configured to receive a mean MPI compensated estimate of the transmitted amplitude of the input signal and to generate a decision of the transmitted amplitude of the input signal, wherein the mean MPI compensated estimate of the transmitted amplitude of the input signal is determined based on the first estimate of the transmitted amplitude of the input signal and a mean MPI signal representative of a mean of the optical MPI.

2. The system of claim 1, wherein the mean MPI compensated estimate of the transmitted amplitude of the input signal includes the first estimate of the transmitted amplitude of the input signal reduced by the mean MPI signal.

3. The system of claim 1, further comprising:
    an accumulator module configured to receive a difference signal determined based on a difference between the mean MPI compensated estimate of the transmitted amplitude of the input signal and the decision of the transmitted amplitude of the input signal and to generate the mean MPI signal based on the difference signal.

4. The system of claim 3, further comprising:
    a subtractor module, coupled to the accumulator module, configured to subtract the mean MPI signal from the first estimate of the transmitted amplitude of the input signal to generate the mean MPI compensated estimate of the transmitted amplitude of the input signal.

5. The system of claim 3, further comprising:
    a subtractor module, coupled to the slicer, configured to subtract the decision of the transmitted amplitude of the input signal from the mean MPI compensated estimate of the transmitted amplitude of the input signal to generate the difference signal; and
    a multiplier, coupled to the subtractor module, configured to multiply the difference signal by a gain factor and to provide the multiplied difference signal to the accumulator module.

6. The system of claim 1, further comprising:
    an equalizer configured to receive the input signal and to generate the estimate of the transmitted light intensity of the input signal.

7. The system of claim 1, further comprising a decision feedback loop.

8. The system of claim 7, wherein the decision feedback loop comprises:
    a delay module, coupled to the slicer, configured to receive an estimate of the transmitted amplitude of the input signal and to output a delayed estimate of the transmitted amplitude of the input signal; and
    a multiplier configured to scale the delayed estimate of the transmitted amplitude of the input signal to generate a scaled delayed estimate of the transmitted amplitude of the input signal.

9. The system of claim 8, further comprising:
    a subtractor module, coupled to the delay module, configured to subtract the scaled delayed estimate from the first estimate of the transmitted amplitude of the input signal.

10. The system of claim 1, wherein the mean MPI signal is generated based on a difference between the mean MPI compensated estimate of the transmitted amplitude of the input signal and the decision of transmitted amplitude of the input signal.

11. A method for compensating for optical multi-path interference (MPI) in an input signal received over an optical fiber, comprising:
    receiving an estimate of a transmitted light intensity of the input signal;
    generating a first estimate of a transmitted amplitude of the input signal based on the estimate of the transmitted light intensity of the input signal;
    determining a mean MPI compensated estimate of the transmitted amplitude of the input signal based on the first estimate of the transmitted amplitude of the input signal and a mean MPI signal representative of a mean amplitude of the optical MPI; and
    generating a decision of the transmitted amplitude of the input signal based on the mean MPI compensated estimate of the transmitted amplitude of the input signal.

12. The method of claim 11, wherein the mean MPI compensated estimate of the transmitted amplitude of the input signal includes the first estimate of the transmitted amplitude of the input signal reduced by the mean MPI signal.

13. The method of claim 11, further comprising:
    generating the mean MPI signal based on a difference signal determined based on a difference between the mean MPI compensated estimate of the transmitted amplitude of the input signal and the decision of the transmitted amplitude of the input signal.

14. The method of claim 13, further comprising:
subtracting the mean MPI signal from the first estimate of the transmitted amplitude of the input signal to generate the mean MPI compensated estimate of the transmitted amplitude of the input signal.

15. The method of claim 13, further comprising:
subtracting the decision of the transmitted amplitude of the input signal from the mean MPI compensated estimate of the transmitted amplitude of the input signal to generate the difference signal; and
multiplying the difference signal by a gain factor.

16. The method of claim 11, further comprising:
generating the estimate of the transmitted light intensity of the input signal based on the input signal.

17. The method of claim 11, further comprising:
providing a delayed estimate of the transmitted amplitude of the input signal based on an estimate of the transmitted amplitude of the input signal; and
scaling the delayed estimate of the transmitted amplitude of the input signal to generate a scaled delayed estimate of the transmitted amplitude of the input signal.

18. The method of claim 17, further comprising:
subtracting the scaled delayed estimate from the first estimate of the transmitted amplitude of the input signal.

19. A system for compensating for optical multi-path interference (MPI) in an input signal received over an optical fiber, comprising:

a converter module configured to generate a first estimate of a transmitted amplitude of the input signal based on a received estimate of a transmitted light intensity of the input signal; and a slicer configured to generate a decision of the transmitted amplitude of the input signal based on a mean MPI compensated estimate of the first estimate of the transmitted amplitude of the input signal, wherein the mean MPI compensated estimate of the first estimate of the transmitted amplitude of the input signal is determined based on the first estimate of the transmitted amplitude of the input signal and a mean MPI signal representative of a mean of the optical MPI.

20. The system of claim 19, further comprising a decision feedback loop, the decision feedback loop comprising:

a delay module, coupled to the slicer, configured to receive an estimate of the transmitted amplitude of the input signal and to output a delayed estimate of the transmitted amplitude of the input signal; and a multiplier configured to scale the delayed estimate of the transmitted amplitude of the input signal to generate a scaled delayed estimate of the transmitted amplitude of the input signal.

* * * * *